US012131405B2

(12) United States Patent
Goldberg et al.

(10) Patent No.: US 12,131,405 B2
(45) Date of Patent: Oct. 29, 2024

(54) USER RESPONSIVE AUGMENTED REALITY ENHANCEMENT OF MOVING IMAGES

(71) Applicant: Disney Enterprises, Inc., Burbank, CA (US)

(72) Inventors: Evan M. Goldberg, Burbank, CA (US); Alexandra Christiansen, Van Nuys, CA (US); Jackson Aaron Rogow, Los Angeles, CA (US); James Voris, San gabriel, CA (US); Alice Jane Taylor, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 118 days.

(21) Appl. No.: 17/887,742

(22) Filed: Aug. 15, 2022

(65) Prior Publication Data

US 2024/0054690 A1 Feb. 15, 2024

(51) Int. Cl.
*G06T 11/00* (2006.01)
*G06F 3/14* (2006.01)
*G06T 5/50* (2006.01)
*G06T 5/94* (2024.01)

(52) U.S. Cl.
CPC ............ *G06T 11/00* (2013.01); *G06F 3/1423* (2013.01); *G06F 3/1454* (2013.01); *G06T 5/50* (2013.01); *G06T 5/94* (2024.01); *G06T 2207/10016* (2013.01)

(58) Field of Classification Search
None
See application file for complete search history.

(56) References Cited

U.S. PATENT DOCUMENTS

| 9,213,405 B2 | 12/2015 | Perez |
| 9,330,431 B2 | 5/2016 | Huang |
| 9,355,617 B2 | 5/2016 | Izumihara et al. |

(Continued)

FOREIGN PATENT DOCUMENTS

| EP | 3 121 688 A1 | 1/2017 |
| EP | 3386204 | 10/2018 |

(Continued)

OTHER PUBLICATIONS

International Search Report and Written Opinion dated Sep. 26, 2023 for International Application PCT/US2023/025471.

(Continued)

*Primary Examiner* — Frank S Chen
(74) *Attorney, Agent, or Firm* — Farjami & Farjami LLP

(57) ABSTRACT

A system includes an augmented reality (AR) device having a first display, processing hardware, and a memory storing software code. The processing hardware is configured to execute the software code to monitor media content including a sequence of moving images displayed on a second display separate from the AR device and controlled by a media player device, detect, based on monitoring the media content, an image in the sequence of moving images for enhancement by one or more AR effects. The processing hardware further executes the software code to render the one or more AR effects on the first display, and transmit, contemporaneously with rendering the one or more AR effects on the first display, a signal configured to pause or loop the playing of the media content on the second display.

26 Claims, 7 Drawing Sheets

(56) References Cited

U.S. PATENT DOCUMENTS

| | | | |
|---|---|---|---|
| 9,384,594 | B2 | 7/2016 | Maciocci |
| 9,674,047 | B2 | 6/2017 | Fein |
| 9,996,150 | B2 | 6/2018 | Swaminathan |
| 10,075,758 | B2 | 9/2018 | Ayers |
| 10,078,917 | B1* | 9/2018 | Gaeta ................. G06F 3/04815 |
| 10,169,921 | B2 | 1/2019 | Jayaraj |
| 10,719,989 | B2 | 7/2020 | Stahl |
| 10,943,121 | B2 | 3/2021 | Bates |
| 2002/0089530 | A1* | 7/2002 | Markel ............. H04N 21/8166 348/E7.071 |
| 2009/0024617 | A1* | 1/2009 | Cope ..................... G11B 27/10 707/999.005 |
| 2011/0285704 | A1 | 11/2011 | Takeda et al. |
| 2012/0127284 | A1* | 5/2012 | Bar-Zeev .............. G06T 19/006 348/158 |
| 2016/0163063 | A1* | 6/2016 | Ashman ................ G06T 19/006 345/633 |
| 2017/0201808 | A1 | 7/2017 | Chowdhary et al. |
| 2018/0191769 | A1* | 7/2018 | Anderson ........... H04L 63/1441 |
| 2018/0367835 | A1* | 12/2018 | Hamidi-Rad ........... G06T 11/60 |
| 2019/0222776 | A1* | 7/2019 | Carter ..................... H04N 5/272 |
| 2020/0035025 | A1* | 1/2020 | Crocker ................ G06T 19/006 |
| 2020/0201514 | A1 | 6/2020 | Murphy |
| 2020/0260154 | A1 | 8/2020 | Comito et al. |
| 2020/0294313 | A1* | 9/2020 | Arroyo Palacios ..... G06T 13/40 |
| 2020/0342231 | A1* | 10/2020 | Richter .................. G06V 20/20 |
| 2020/0364937 | A1 | 11/2020 | Selbrede |
| 2021/0096638 | A1* | 4/2021 | O'Hern ................ G06F 3/04815 |
| 2021/0150212 | A1* | 5/2021 | Richey .................... G06V 20/40 |
| 2021/0326594 | A1* | 10/2021 | Costello ................. G06V 20/35 |
| 2021/0342590 | A1 | 11/2021 | Choi et al. |
| 2022/0005322 | A1* | 1/2022 | Pilnock ............... G07F 17/3288 |
| 2023/0206568 | A1 | 6/2023 | Du et al. |
| 2023/0316683 | A1* | 10/2023 | Hare ....................... H04L 51/10 345/419 |

FOREIGN PATENT DOCUMENTS

| | | |
|---|---|---|
| KR | 101962571 B1 | 3/2019 |
| KR | 102330894 B1 | 12/2021 |
| WO | WO 2015/192117 A1 | 12/2015 |
| WO | WO 2021085130 | 5/2021 |
| WO | WO 2021173147 A1 | 9/2021 |

OTHER PUBLICATIONS

International Search Report and Written Opinion dated Sep. 18, 2023 for International Application PCT/US2023/025477.

International Search Report for PCT/US/2023/025476 dated Sep. 4, 2023.

File History of U.S. Appl. No. 17/887,731, filed Aug. 15, 2022.

File History of U.S. Appl. No. 17/887,754, filed Aug. 15, 2022.

Antti Ajanki, Mark Billinghurst, Hannes Gamper, Toni Jarvenpaa, Melih Kandemir, Samuel Kaski, Markus Koskela, Mikko Kurimo, Jorma Laaksonen, Kai Puolamaki, Teemu Ruokolainen, Timo Tossavainen "An Augmented Reality Interface to Contextual Information" SI: Augmented Reality Dec. 16, 2010 13 Pgs.

Radiah Rivu, Yasmeen Abdrabou, Ken Pfeuffer, Augusto Esteves, Stefanie Meitner, Florian Alt "StARe: Gaze-Assisted Face-to-Face Communication in Augmented Reality" ETRA '20, Jun. 2-5, 2020, Stuttgart, Germany 5 Pgs.

* cited by examiner

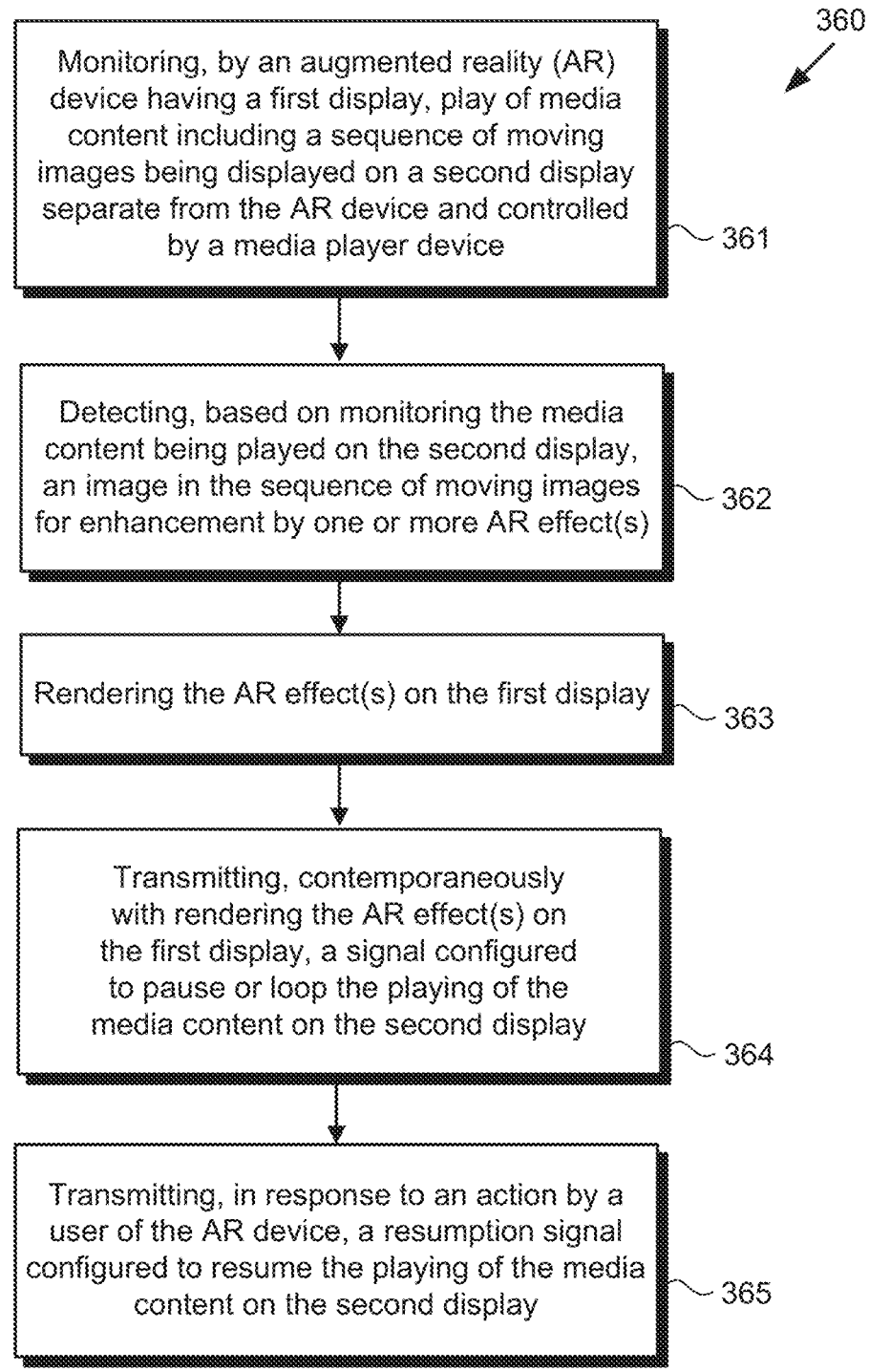

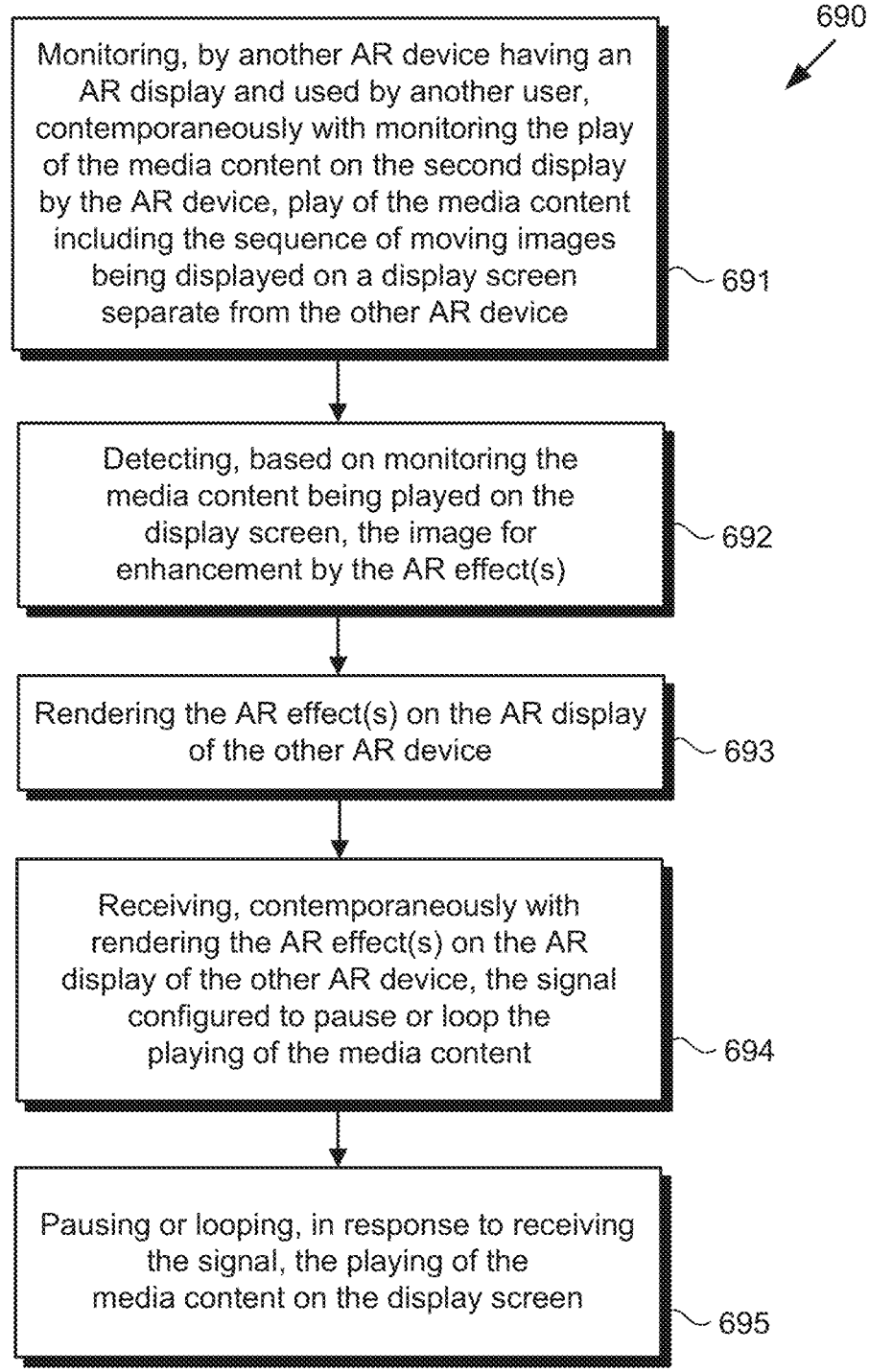

USER RESPONSIVE AUGMENTED REALITY ENHANCEMENT OF MOVING IMAGES

BACKGROUND

Advances in computer technology and software have made possible the generation of richly featured augmented reality (AR) experiences for users. AR experiences can merge virtual objects or characters with real-world features in a way that can, in principle, provide a powerfully immersive experience. Traditional moving pictures (e.g. movies or videos played on a television screen) have become more interactive through branching narrative journeys where media segments are the result of user-specified decisions. AR synced with and controlling the playback of movies has the ability to add new layers of immersion to the storytelling experience and novels ways for the viewer to affect the narrative journey.

However, one limitation associated with conventional AR experiences is that their interactive effects tend to be self-contained, only influencing the graphics of the immediate AR scene or a nearby networked-AR scene (for multi-user experiences). A limitation with conventional branching narratives is the requirement of a very out-of-story method for viewers to make such decision (e.g., onscreen prompts and remote control button presses). Consequently, there is a need in the art for a solution enabling the provision of AR experiences across media types, as well as dynamic narratives in traditional moving pictures that are responsive to interactions with the AR experience by the user in natural, organic ways.

BRIEF DESCRIPTION OF THE DRAWINGS

FIG. 3 shows a flowchart outlining an exemplary method for use by a system to provide user responsive AR enhancement of moving images, according to one implementation;

FIG. 6 shows a flowchart including exemplary additional actions for extending the method outlined by the flowchart in FIG. 3, according to one implementation.

DETAILED DESCRIPTION

Figure 1:
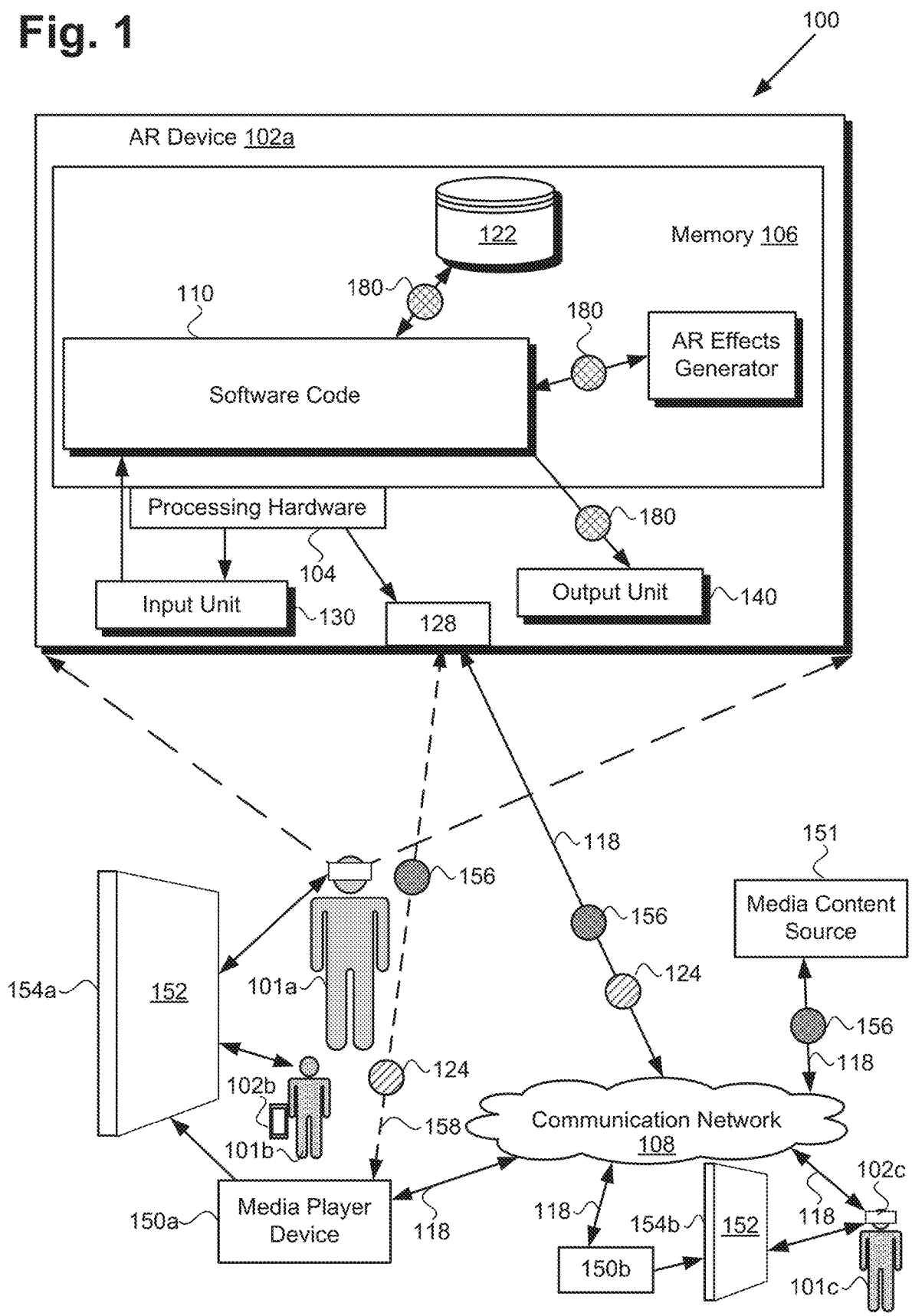
FIG. 1 shows an exemplary system for providing user responsive augmented reality (AR) enhancement of moving images, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing user responsive augmented reality (AR) enhancement of moving images. It is noted that, as defined in the present application, the term "moving images" refers to imagery produced by play of a sequence of video frames. Moreover, as defined herein, the term "anchor image" refers to an image serving as a two-dimensional (2D) image template upon which one or more AR effects may be overlaid, or from which one or more AR effects may extend into an environment in which a display displaying the anchor image is located. In various use cases, an anchor image may be a single video frame in its entirety, an image included in a portion of a single video frame that is less than the entire video frame, or to a sequence of multiple video frames. It is further noted that the user responsive AR enhancement solution disclosed in the present application may be implemented as automated systems and methods.

As used in the present application, the terms "automation," "automated," and "automating" refer to systems and processes that do not require the participation of a human administrator. Although in some implementations the user responsive AR enhancements provided by the systems and methods disclosed herein may be reviewed or even modified by a human editor or system administrator, that human involvement is optional. Thus, the methods described in the present application may be performed under the control of hardware processing components of the disclosed systems.

FIG. 1 shows exemplary system 100 configured to provide user responsive AR enhancement of moving images, according to one implementation. System 100 includes AR device 102a having processing hardware 104, input unit 130, output unit 140, transceiver 128, and memory 106 implemented as a computer-readable non-transitory storage medium.

As shown in FIG. 1, according to the present exemplary implementation, memory 106 stores software code 110, optional AR effects generator 120, and optional AR effects database 122.

As further shown in FIG. 1, system 100 is implemented within a use environment including user 101a of AR device 102a, media content 152 including a sequence of moving images displayed on display 154a, media player device 150a playing media content 152 being displayed on display 154a, media content source 151, and communication network 108. In addition. FIG. 1 shows AR device 102b utilized by user 101b, AR device 102c utilized by user 101c, media player device 150b playing out media content 152 being displayed on display 154b, and one or more AR effects 180 (hereinafter "AR effect(s) 180") obtained by software code 110 from one of AR effects generator 120 or AR effects database 122. Also shown in FIG. 1 are signal 124 configured to pause or loop the playing of media content 152 on display 154b, resumption signal 156, and bidirectional communication channel 158, which may be a wireless communication link between AR device 102a and media player device 150a, as well as network communication links 118 of communication network 108.

It is noted that AR devices 102b and 102c correspond in general to AR device 102a, and may include any of the features of AR device 102a described in the present application. That is to say, like AR device 102a, each of AR devices 102b and 102c may include features corresponding respectively to processing hardware 104, input unit 130, output unit 140, transceiver 128, and memory 106. Moreover, the respective memories of AR devices 102b and 102c may store other instantiations of software code 110 and, in some implementations, different instantiations of one or both of AR effects generator 120 and AR effects database 122.

It is also noted that although AR devices 102a and 102c depicted as head mounted AR devices, while AR device 102b is depicted as a handheld AR device, those representations are merely exemplary. In various implementations, any or all of AR devices may take the form of head mounted AR devices, such as AR glasses, AR goggles, or AR headsets, for example, or handheld AR devices, such smartphones, tablet computers, or handheld devices specifically configured for AR use.

It is further noted that although FIG. 1 depicts AR effects generator 120 and AR effects database 122 as being elements of AR device 102a, stored in memory 106, that representation is merely exemplary. In other implementations, one or both of AR effects generator 120 and AR effects database 122 may be omitted from AR device 102a, but may be accessible to AR device 102a, as well as to AR devices 102b and 102c, via communication network 108 and network communication links 118 as remote resources.

Furthermore, although the present application refers to software code 110 and one or both of AR effects generator 120 and AR effects database 122 as being stored in memory 106 for conceptual clarity, more generally, memory 106 may take the form of any computer-readable non-transitory storage medium. The expression "computer-readable non-transitory storage medium." as defined in the present application, refers to any medium, excluding a carrier wave or other transitory signal that provides instructions to processing hardware 104 of AR device 102a. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs. RAM, programmable read-only memory (PROM), erasable PROM (EPROM), and FLASH memory.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of AR device 102a, as well as a Control Unit (CU) for retrieving programs, such as software code 110, from memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

As defined in the present application, the expression "machine learning model" may refer to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to a NN that utilizes multiple hidden layers between input and output layers, which may allow for learning based on features not explicitly defined in raw data.

Transceiver 128 of system 100 may be implemented as any suitable wireless communication unit. For example, transceiver 128 may be implemented as a fourth generation (4G) wireless transceiver, or as a 5G wireless transceiver. In addition, or alternatively, transceiver 128 may be configured for communications using one or more of Wireless Fidelity (Wi-Fi), Worldwide Interoperability for Microwave Access (WiMAX), Bluetooth, Bluetooth low energy. ZigBee, radio-frequency identification (RFID), near-field communication (NFC), and 60 GHz wireless communications methods.

Figure 2A:
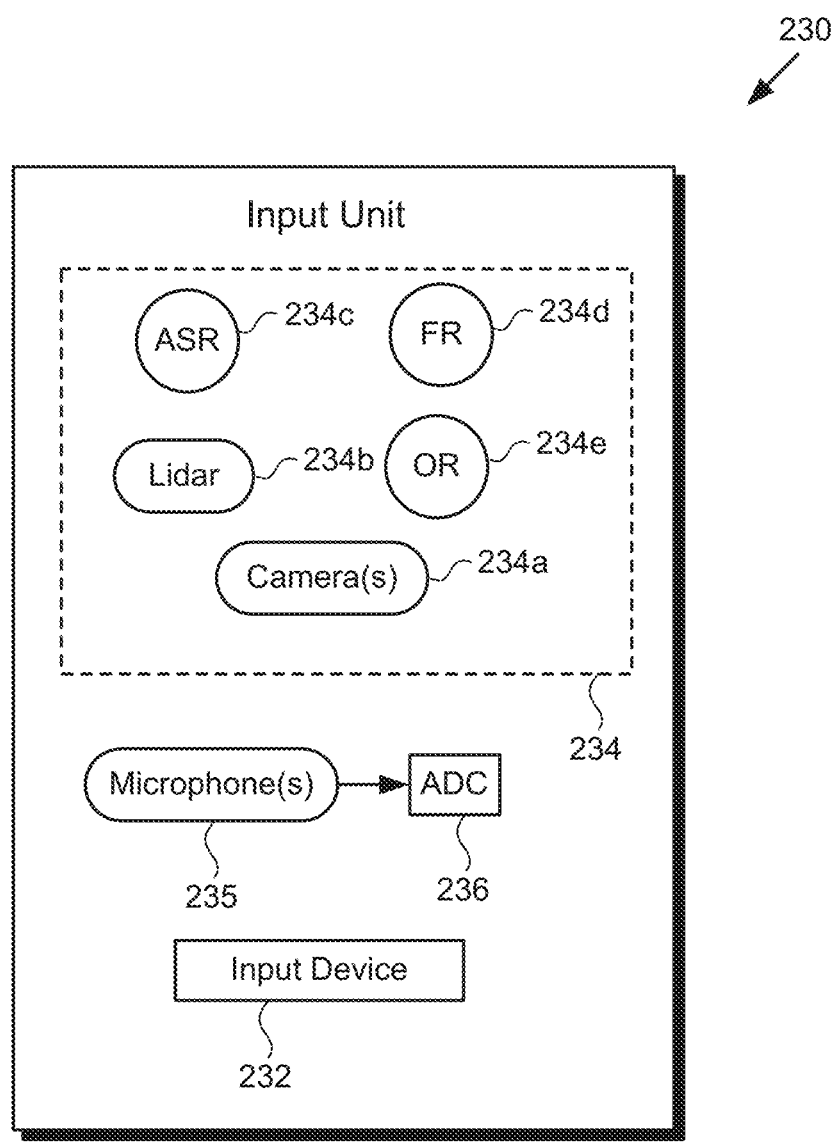
FIG. 2A shows a more detailed diagram of an input unit suitable for use as a component of the system shown in FIG. 1, according to one implementation.

FIG. 2A shows a more detailed diagram of input unit 230 suitable for use as a component of AR device 102a, in FIG. 1, as well as AR devices 102b and 102c in that figure, according to one implementation. As shown in FIG. 2A, input unit 230 may include input device 232, such as a touchscreen or keyboard for example, as well as multiple sensors, sensing modules, or sensors and sensing modules 234 (hereinafter "sensors/sensing modules 234"), one or more microphones 235 (hereinafter "microphone(s) 235"), and analog-to-digital converter (ADC) 236. As further shown in FIG. 2A, sensors/sensing modules 234 of input unit 230 may include one or more cameras 234a (hereinafter "camera(s) 234a"); laser imaging, detection, and ranging (lidar) detector 234b; automatic speech recognition (ASR) module 234c; facial recognition (FR) module 234d; object recognition (OR) module 234e; and one or more position/location sensors 234f (hereinafter "P/L sensor(s) 234f").

Camera(s) 234a may include various types of cameras, such as one or more red-green-blue (RGB) still image cameras, video cameras, RGB-D cameras that include a depth sensor, infrared (IR) cameras, or combinations thereof to name a few examples. P/L sensor(s) 234f may include one or more accelerometers, one or more gyroscopes, a Global Positioning System (GPS) receiver, a magnetometer, or any combination of such features, for example. In some implementations, P/L sensor(s) 234f may be implemented as an inertial measurement unit (IMU).

Input unit 230 corresponds in general to input unit 130, in FIG. 1. Thus, input unit 130 may share any of the characteristics attributed to input unit 230 by the present disclosure, and vice versa. It is noted that the specific modules shown to be included among sensors/sensing modules 234 of input unit 130/230 are merely exemplary, and in other implementations, sensors/sensing modules 234 of input unit 130/230 may include more, or fewer, modules than camera(s) 234a, lidar detector 234b, ASR module 234c. FR module 234d, OR module 234e, and P/L sensor(s) 234f. For example, in addition to, or as alternatives to the specific sensors shown in FIG. 2A, input unit 130/230 may include sensors for detecting one or more of ambient light, temperature, and atmospheric pressure, to name a few.

Figure 2B:
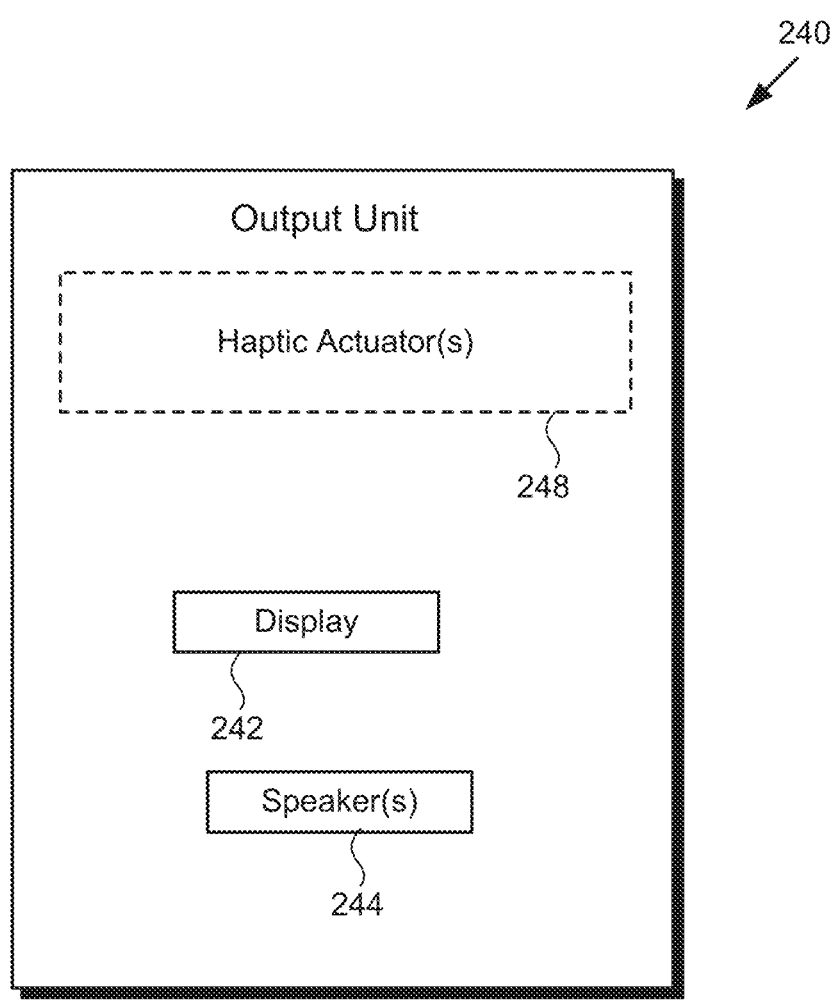
FIG. 2B shows a more detailed diagram of an output unit suitable for use as a component of the system shown in FIG. 1, according to one implementation.

FIG. 2B shows a more detailed diagram of output unit 240 suitable for use as a component of AR device 102a, in FIG. 1, as well as AR devices 102b and 102c in that figure, according to one implementation. As shown in FIG. 2B, output unit 240 may include display 242 and one or more audio speakers 244 (hereinafter "audio speaker(s) 244"). As further shown in FIG. 2B, in some implementations, output unit 240 may optionally include one or more haptic actuators 248 (hereinafter "haptic actuator(s) 248"). Display 242 may be implemented as a liquid crystal display (LCD), a light-emitting diode (LED) display, an organic light-emitting diode (OLED) display, a quantum dot (QD) display, or any other suitable display screen that performs a physical transformation of signals to light.

Output unit 240 corresponds in general to output unit 140, in FIG. 1. Thus, output unit 140 may share any of the characteristics attributed to output unit 240 by the present disclosure, and vice versa. It is noted that the specific features shown to be included in output unit 140/240 are merely exemplary, and in other implementations, output unit 140/240 may include more, or fewer, features than display 242, audio speaker(s) 244, and haptic actuator(s) 248.

The functionality of system 100 will be further described by reference to FIG. 3. FIG. 3 shows flowchart 360 presenting an exemplary method for use by system 100 to provide user responsive AR enhancement of moving images, according to one implementation. With respect to the method outlined in FIG. 3, it is noted that certain details and features have been left out of flowchart 360 in order not to obscure the discussion of the inventive features in the present application.

Referring to FIG. 3, with further reference to FIGS. 1 and 2A, flowchart 360 includes monitoring play of media content 152 including a sequence of moving images being displayed on display 154a separate from AR device 102a and controlled by media player device 150a (action 361). Monitoring of media content 152 in action 361 may include using one or more sensors/sensing modules 234. In one example, monitoring of media content 152 in action 361 may include using camera(s) 234a to capture imagery of the sequence of moving images being displayed on display 154a.

In addition, or alternatively, action 361 may include using one or more of lidar detector 234b, OR module 234e, P/L sensor(s) 234f, or microphone(s) 235 to provide location data for use in determining a position of display 154a in relation to AR device 102a, such as a position including one or more of an x, y, or z location coordinate of display 154a in relation to AR device 102a. Moreover, where location data includes audio data obtained by microphone(s) 235 as a result of monitoring media content 152, location data may further include microphone metadata describing the angle of arrival of sound at microphone(s) 235. Action 361 may be performed by software code 110, executed by processing hardware 104 of AR device 102a, and using features of input unit 130/230 described above.

In some implementations, action 361 may further include receiving playhead data indicating a playhead state of media player device 150a playing media content 152 being displayed on display 154a. In some implementations, that playhead data may take the form of audio data output by media player device 150a during playout of media content 152 being displayed on display 154a, and may be received using microphone(s) 235. However, in other implementations, playhead data may be included in an inaudible wireless communication from media player device 150a during playout of media content 152 being displayed on display 154a, and may be received using transceiver 128 via bidirectional communication channel 158. In yet other implementations, playhead data may be received from remote media content source 151 of media content 152 being displayed on display 154a, via communication network 108 and network communication links 118.

The playhead data would typically indicate the present playback state of media player device 150a, such as play, pause, fast forward, or rewind, for example, and may further indicate a timestamp or video frame number of a presently displayed moving image of the sequence of moving images displayed on display 154a. In addition, in some implementations. AR device 102a may receive one or more of a variety of display parameters, such as audio level and including display screen parameters such as hue, saturation, brightness, contrast, and tint, for example.

Continuing to refer to FIGS. 1, 2A, and FIG. 3 in combination, flowchart 360 further includes detecting, based on monitoring media content 152 being played on display 154a, an image in the sequence of moving images for enhancement by AR effect(s) 180 (action 362). It is noted that, in some implementations, the image for enhancement by AR effect(s) 180 detected in action 362, may be an anchor image for AR effects 180. As defined above, the term "anchor image" refers to an image serving as a 2D image template upon which one or more AR effects may be overlaid, or from which one or more AR effects may extend into an environment in which display 154a displaying the anchor image is located. However, in other implementations, the image detected in action 362 may serve, not as an anchor image, but simply as a cue for enhancement of the environment in which that image is displayed by display 154a. It is noted that anchor images are described in detail in U.S. patent application Ser. No. 17/887,731, titled "Augmented Reality Enhancement of Moving Images." filed concurrently with the present application, and hereby incorporated fully by reference into the present application.

In various use cases in which the image for enhancement by AR effect(s) 180, detected in action 362, is an anchor image, such an anchor image may be a single video frame of the sequence of moving images being displayed on display screen 154, an image included in a portion of a single video frame of the sequence of moving images being displayed on display screen 154 that is less than the entire video frame, or to a sequence including one or more video frames, one or more portions of video frames, or a combination of one or more video frames with one or more portions of video frames within the sequence of moving images being displayed on display screen 154.

Figure 4:
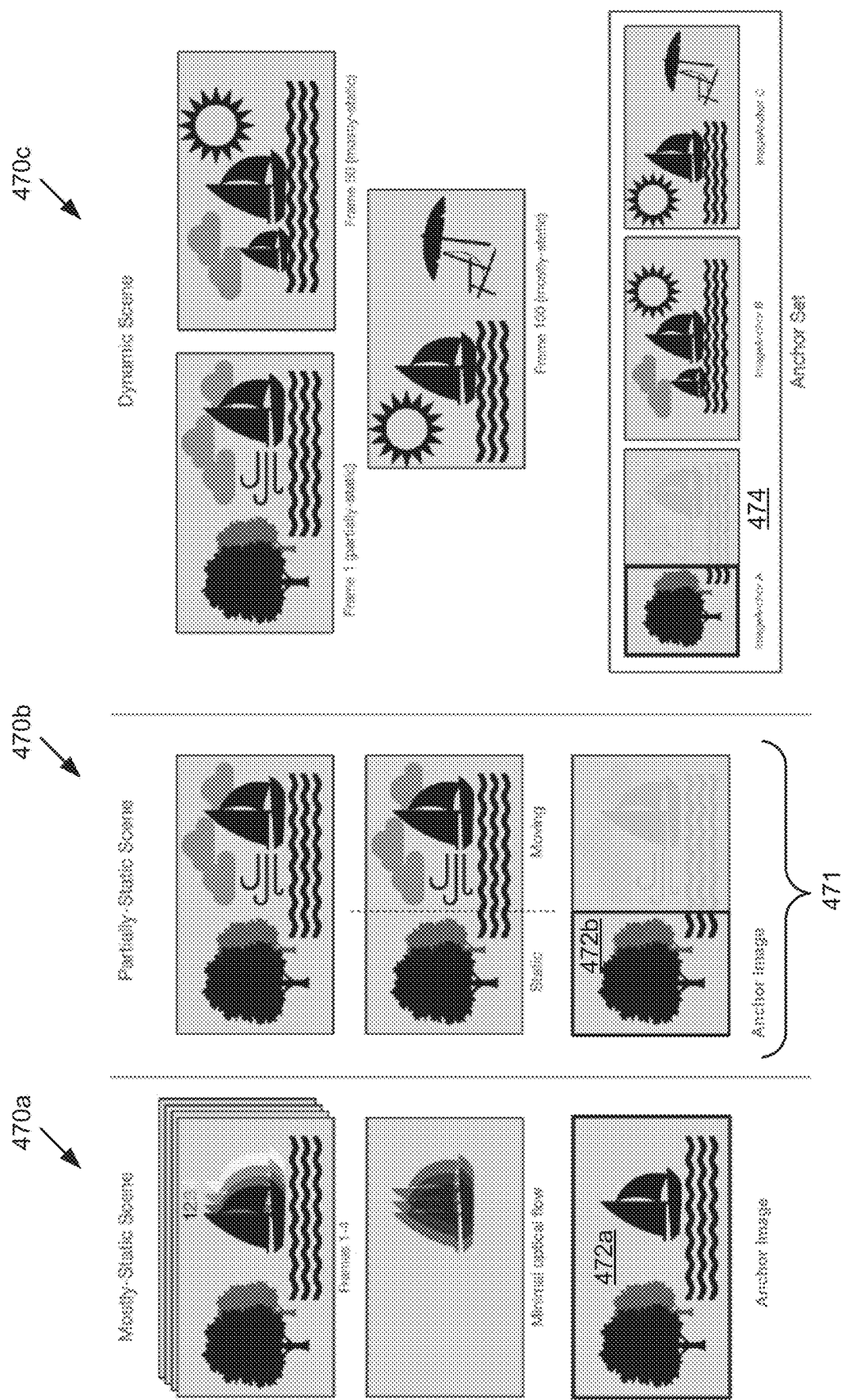
FIG. 4 shows respective diagrams depicting three exemplary use cases identifying one or more anchor images suitable for use in providing user responsive AR enhancement of moving images, according to various implementations.

FIG. 4 shows respective diagrams 470a, 470b, and 470c depicting three exemplary use cases identifying anchor images suitable for use in providing user responsive AR enhancement of moving images, according to various implementations. As shown by diagram 470a, where a scene including multiple moving images includes only video frames that are mostly static, i.e., remain substantially the same from video frame to video frame, any one of the video frames within that scene may serve as anchor image 472a. That is to say, anchor image 472a is the entire video frame that includes the mostly static boat, water, and tree. It is noted that, as used in the present application, the term "scene," as applied to video content, is a shot or series of shots that together deliver a single, complete and unified dramatic element of film narration, or block of storytelling within a film. Moreover, as used in the present application, the term "shot" refers to a sequence of frames of video that are captured from a unique camera perspective without cuts or other cinematic transitions.

As further shown by diagram 470b, where a scene including multiple moving images includes video frames that are partially-static, i.e., some elements change significantly from video frame to video frame but include some imagery that is mostly static from video frame to video frame, that static imagery portion of any one of the video frames within that scene may serve as anchor image 472b. That is to say, anchor image 472b includes only the tree portion of video frame 471.

As yet further shown by diagram 470c, where a scene including multiple moving images includes video frames that are dynamic. i.e., video frames including imagery that changes substantially from video frame to video frame, a subset of multiple video frames, portions of video frames, or both, may serve as anchor set of images 474. That is to say, in some implementations, the anchor image may include multiple images. With respect to the expression "imagery that changes substantially from video frame to video frame," that expression refers to change of the composition as a whole of the imagery from frame-to-frame. In diagram 470c, for example, the boat changes location from frame right, to frame center, to frame left, while other features, such as a tree, umbrella, and chair move and appear or disappear at different timestamps.

In some implementations, the image detected in action 362 may be manually predetermined. However, in other implementations, the image detected in action 362 may be detected algorithmically by AR device 102a during playout of media content 152 being displayed on display 154a. Action 362 may be performed by software code 110, executed by processing hardware 104 of AR device 102a. It is noted that although flowchart 360 lists action 362 as following action 361, that representation is merely exemplary. In various implementations, actions 361 and 362 may be performed in parallel, i.e., contemporaneously with another.

Referring to FIGS. 1, 2B, and FIG. 3 in combination, flowchart 360 further includes rendering AR effect(s) 180 on display 242 of AR device 102a (action 363). It is noted that, in some implementations. AR effect(s) 180 may be rendered in action 363 such that AR effect(s) 180 are spatially aligned with the sequence of moving images being displayed on display 154a, temporally aligned with the sequence of moving images, or both spatially and temporally aligned with that sequence of moving images. As noted above, action 361 may include determining the position of display 154a in relation to AR device 102a, such as one or more of an x, y, or z location coordinate of display 154a in relation to AR device 102a. In those implementations, AR effect(s) 180 may be rendered on display 242 of AR device 102a further based on the position of display 154a in relation to AR device 102a. Action 363 may be performed by software code 110, executed by processing hardware 104 of AR device 102a.

Referring to FIG. 1, in some implementations, some or all of AR effect(s) 180 rendered in action 363 may be predetermined and stored in AR effects database 122. In those implementations, the some or all of predetermined AR effects 180 may be obtained for rendering in action 363 by being retrieved from AR effects database 122. However, in other implementations, some or all of AR effect(s) 180 may be obtained for rendering in action 363 by being generated by AR device 102a using AR effects generator 120. Whether AR effect(s) 180 are retrieved from AR effects database 122 or generated using AR effects generator 120. AR effect(s) may be obtained for rendering in action 363 by software code 110, executed by processing hardware 104 of AR device 102a.

As noted above, in some implementations, AR device 102a may receive one or more of a variety of display parameters of display 154a, such as hue, saturation, brightness, contrast, and tint of display 154a, for example. In those implementations, processing hardware 104 of AR device 102a may execute software code 110 to receive the one or more display parameters of display 154a, and to render AR effect(s) 180 in action 363 using the display parameters of display 154a. By way of example, processing hardware 104 of AR device 102a may execute software code 110 to use the one or more display parameters of display 154a to adjust display parameters of display 242 of AR device 102a such that AR effect(s) 180 are rendered so as to complement or contrast with media content 152 being displayed on display 154a.

Referring to FIGS. 1 and 3 in combination, flowchart 360 further includes transmitting, contemporaneously with rendering AR effect(s) 180 on the display 242 of AR device 102a in action 363, signal 124 configured to pause or loop the playing of media content 152 on display 154a (action 364). In some implementations, signal 124 may be transmitted to media player device 150a in action 364, by software code 110, executed by processing hardware 104 of AR device 102a, and using transceiver 128 and bidirectional communication channel 158, or communication network 108 and network communication links 118. However, in other implementations, signal 124 may be transmitted to media content source 151 in action 364, which may be a media streaming platform remote from AR device 102a for example, by software code 110, executed by processing hardware 104 of AR device 102a, and using transceiver 128, communication network 108, and network communication links 118. In implementations in which signal 124 is transmitted to media content source 151 in action 364, signal 124 may be relayed to media player device 150a by media content source 151, using communication network 108 and network communication links 118.

In some implementations, the transmission of signal 124 in action 364 may occur automatically when AR effect(s) 180 are rendered in action 363. In other words, in some implementations, actions 363 and 364 may be performed automatically and in parallel. However, in other implementations, action 364 may follow action 363, and may occur in response to an action by user 101a of AR device 102a. Actions by user 101a to which transmitting of signal 124 may be responsive may include an input to AR device 102a using input device 232 of AR device 102a, or a voice command, for example.

Pausing or looping the playing of media content 152 on display 154a while AR effect(s) 180 are rendered on display 242 of AR device 102a advantageously enables user 101a to selectively explore and interact with those of AR effect(s) 180 that are of interest to user 101a, at the user's own pace. This provides user 101a with a more participatory and self-guided immersion in the synergy between AR effect(s) 180 and media content 152.

Figure 5:
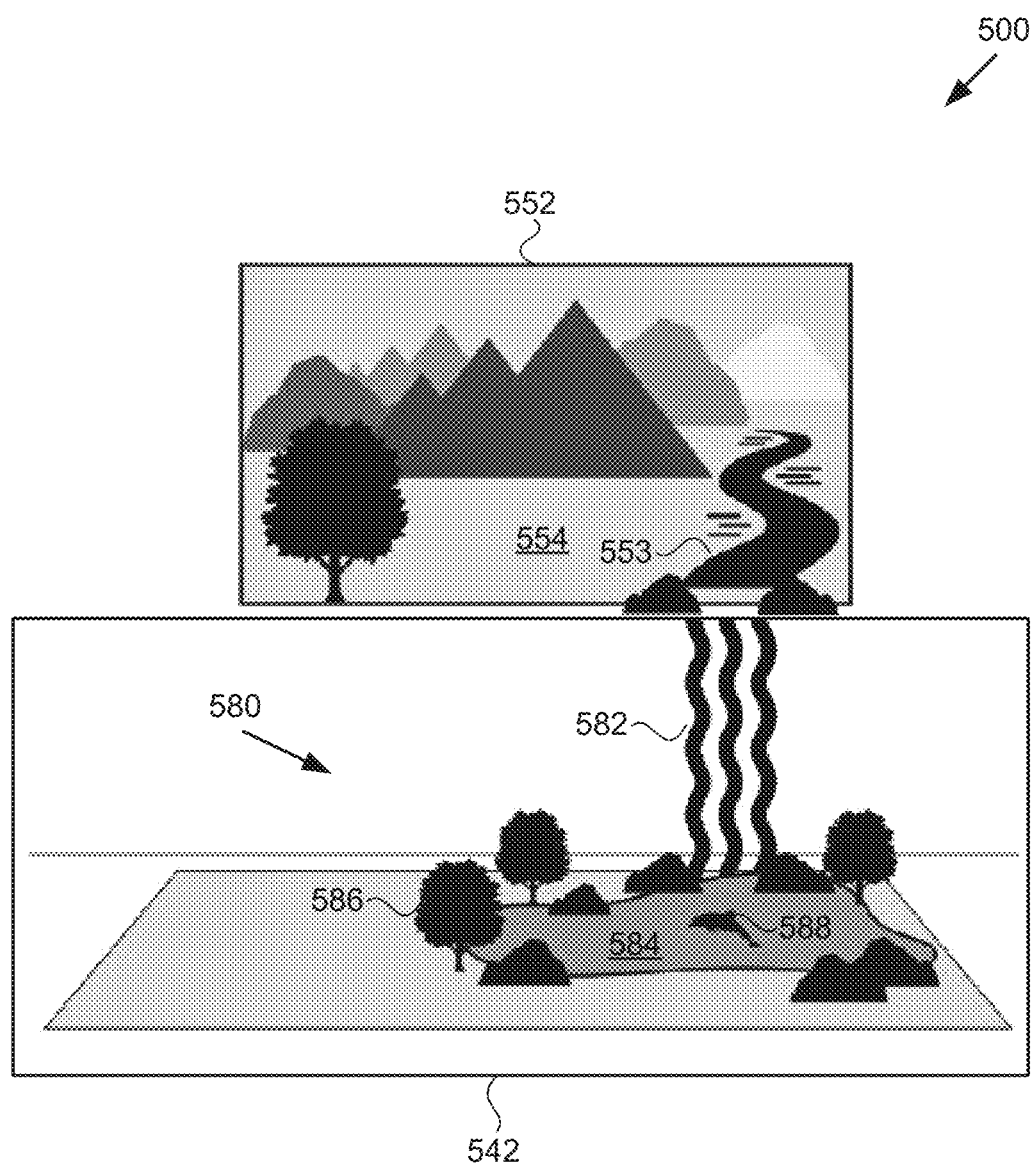
FIG. 5 shows a diagram depicting user responsive AR enhancement of media content including moving images, according to one implementation.

FIG. 5 shows diagram 500 depicting user responsive AR enhancement of media content 552 including moving images, according to one implementation. As shown in FIG. 5, media content 552 is being displayed on display 554, and is enhanced by AR effect(s) 580 rendered on display 542 of an AR device. As further shown in FIG. 5, AR effect(s) 580 include, for example, waterfall 582, plunge pool 584 at the base of waterfall 582, trees 586, and dolphin 588. Also shown in FIG. 5 is river 553 of media content 552, displayed using a sequence of moving images on display 554.

Media content 552, display 554, and AR effect(s) 580 correspond respectively to media content 152, display 154a, and AR effect(s) 180, in FIG. 1. That is to say, media content 152, display 154a, and AR effect(s) 180, may share any of the characteristics attributed to respective media content 552, display 554, and AR effect(s) 580 by the present disclosure, and vice versa. Moreover, display 542, corresponds in general to display 242 of AR device 102a, and those corresponding features may share any of the characteristics attributed to either of those corresponding features by the present disclosure.

It is noted that, as shown in FIG. 5, in some use cases AR effect(s) 580 may optionally be spatially aligned with the sequence of moving images being displayed on display 554 such that river 553 appears to generate waterfall 582 and plunge pool 584 at its base. It is further noted that AR effect(s) 580 may optionally be temporally aligned with the sequence of moving images being displayed on display 154/554 such that the flow rate of river 553 appears to correspond to the volume of water falling into plunge pool 584. Furthermore. AR effect(s) 580 may be temporally aligned with the sequence of moving images being displayed on display 154/554 such that AR effect(s) 180/580 appear and disappear contemporaneously with river 553 to which they correspond.

Referring to FIGS. 1, 2A, and 5 in combination, in some implementations, processing hardware 104 of AR device 102a may further execute software code 110 to use one or more of the features of input unit 130/230 to sense an interaction by user 101a with one or more of AR effect(s) 180/580 while playing of media content 152/552 on display 154a/554 is paused or looped. In some of those implementations, processing hardware 104 of AR device 102a may also execute software code to transmit the sensed interaction by user 101a to media player device 150a via bidirectional communication channel 158. Moreover, in those implementations, media player device 150a may be configured to identify, using the interaction sensed by AR device 102a, one or more other images in the sequence of moving images for displaying on display 154a, and may further display those other images on display 154a.

For example, where user 101a interacts with AR effect(s) 180/580 in the form of trees 586, software code 110 may sense that interaction and transmit it to media player device 150a, whereupon media player device 150a may display images from media content 152 showing more, larger, different types of trees, or different types of flora on display 154a/554. It is noted that in some implementations, those other images in the sequence of moving images may be identified and displayed on display 154a/554 while AR effect(s) 180/580 are rendered and play of media content 152/552 on display 154a/554 is paused or looped in action 364. That is to say the paused or looped content may be replaced with different media (i.e. a different chapter or section of media content 152), and that different media may be identified based on the specific AR interactions by user 101a. In other implementations, however, those other images of the sequence of moving images, identified by media player 150a, may be displayed on display 154a/554 subsequent to resumption of the play of media content 152/552. That is to say, in some use cases, the play of media content 152/552 may resume, after a pause or loop, at a timestamp or video frame number where the playing of media content 152/552 on display 154a/554 was paused or looped, while in other use cases play of media content 152/552 may resume at a timestamp or video frame number other than the timestamp or video frame number where the playing of media content 152/552 on display 154a/554 was paused or looped.

When user 101a has completed their interaction with AR effect(s) 180/580, the method outlined by flowchart 360 may further include transmitting, in response to an action by user 101a, resumption signal 156 configured to resume playing of media content 152/552 on display 154a/554 (action 365). In some implementations, resumption signal 156 may be transmitted to media player device 150a in action 365, by software code 110, executed by processing hardware 104 of AR device 102a, and using transceiver 128 and bidirectional communication channel 158, or communication network 108 and network communication links 118. However, in other implementations, resumption signal 156 may be transmitted to media content source 151 in action 365 by software code 110, executed by processing hardware 104 of AR device 102a, and using transceiver 128, communication network 108, and network communication links 118. In implementations in which resumption signal 156 is transmitted to media content source 151 in action 365, resumption signal 156 may be relayed to media player device 150a by media content source 151, using communication network 108 and network communication links 118.

As noted above, in some use cases, the play of media content 152/552 may resume, in response to resumption signal 156 after a pause or loop, at a timestamp or video frame number where the playing of media content 152/552 on display 154a/554 was paused or looped. However, in other use cases, play of media content 152/552 may resume at a timestamp or video frame number other than the timestamp or video frame number where the playing of media content 152/552 on display 154a/554 was paused or looped. In use cases in which play of media content 152/552 resumes at a timestamp or video frame number other than the timestamp or video frame number where the playing of media content 152/552 on display 154a/554 was paused or looped, media player device 150a may advantageously provide user 101a with a branching narrative experience that is responsive to the interactions of user 101a with AR effect(s) 180/580.

As further noted above, the transmission of resumption signal 156 in action 365 occurs in response to an action by user 101a of AR device 102a. Actions by user 101a to which transmitting of resumption signal 156 may be responsive may include an input to AR device 102a using input device 232 of AR device 102a, a voice command, a gaze change, for example gazing away from AR effect(s) 180, a movement, or deactivation of AR device 102a, for example. For instance, AR device 102a being put down or turned off may trigger transmission of resumption signal 156 in action 365.

In some implementations, the method outlined by flowchart 360 may conclude with action 365. However, in other implementations, processing hardware 104 of AR device 102a may further execute software code 110 to generate one or more audio effects corresponding to AR effect(s) 180/580, one or more haptic effects corresponding to AR effect(s) 180/580, or one or more audio effects and one or more haptic effects corresponding to AR effect(s) 180/580. In those implementations, the method outlined by flowchart 360 may further include, rendering, by software code 110 executed by processing hardware 104, while rendering AR effect(s) 180/580 on display 242/542 of AR device 102a, the one or more audio effects using audio speaker(s) 244, or the one or more haptic effects using haptic actuator(s) 248, or the one or more audio effects using audio speaker(s) 244 and the one or more haptic effects using haptic actuator(s) 248. Alternatively, or in addition, processing hardware 104 of AR device 102a may further execute software code 110 to detect one or more Internet of Things (IoT) connected devices in the environment in which display 154a/554 is located, and may activate those one or more IoT connected devices to produce ambient effects, such as lighting, temperature, aromas, and the like, to further enhance media content 152/552 while AR effect(s) 180/580 are being rendered.

Although actions 361 through 365 are described above by reference to AR device 102a utilized by user 101a, in some implementations, user 101a may be participating in a group watch experience with user 101b utilizing AR device 102b in conjunction with media content 152 being displayed on display 154a. In those implementations, the present novel and inventive concepts may enable either or both of users 101a and 101b to utilize respective AR devices 102a and 102b to execute the method outlined by flowchart 360. That is to say both of AR devices 102a and 102b may be used to monitor media content 152 being displayed on display 154a, detect the image included among the sequence of moving images to be enhanced by AR effect(s) 180, render AR effect(s) 180, transmit signal 124 configured to pause or loop the playing of media content 152, explore and interact with AR effect(s) 180, and transmit resumption signal 156.

Enabling both of users 101a and 101b participating in a group watch experience to pause or loop the playing of media content 152 on display 154a while AR effect(s) 180 are rendered on display 242 of AR device 102a, as well as on the display of AR device 102b, advantageously enables each of users 101a and 101b to selectively and independently explore and interact with those of AR effect(s) 180 that are of interest to each of user 101a and 101b, at their own pace, thereby providing user 101a and 101b with a more participatory and self-guided immersion in the synergy between AR effect(s) 180 and media content 152 because each of users 101a and 101b is able to interact selectively with AR effect(s) 180 of themselves personally.

Alternatively, or in addition, in some implementations, user 101a may be participating in a group watch experience with remote user 101c utilizing AR device 102c in conjunction with media content 152 being displayed on display 154b local to remote user 101c. FIG. 6 shows flowchart 690 including exemplary additional actions for extending the method outlined by flowchart 360, in FIG. 3, in those implementations. It is noted that the additional actions listed in flowchart 690 are described by reference to an exemplary use case in which a selection by user 101a to pause or loop play of media content 152 on display 154a causes play of media content 152 to be paused or looped on display 154b of user 101c as well. However, that use case is merely exemplary, in other use cases, a selection by either of users 101a or 101c to pause or loop play of media content 152 causes play of media content 152 to be paused or looped for the other of users 101a or 101c as well. With respect to the actions outlined in FIG. 6, it is noted that certain details and features have been left out of flowchart 690 in order not to obscure the discussion of the inventive features in the present application.

Referring to FIGS. 1 and 2B, as noted above. AR device 102c may have an AR display corresponding to display 242 of AR device 102a, processing hardware corresponding to processing hardware 104 of AR device 102a, and a memory corresponding to memory 106 of AR device 102a and storing another instantiation of software code 110. According to flowchart 690, the processing hardware of AR device 102c may execute the other instantiation of software code 110 resident in the memory of AR device 102c to perform the actions of monitoring the play of media content 152 including the sequence of moving images being displayed on display 154b separate from AR device 102c (action 691), detecting, based on monitoring media content 152 being played on display 154b, the image for enhancement by AR effect(s) 180, detected in action 362 by AR device 102a (action 692), and rendering AR effect(s) 180 on the AR display of AR device 102c (action 693). It is noted that actions 691, 692, and 693 may be performed contemporaneously with respective actions 361, 362, and 363 of flowchart 360, and in a manner analogous to those respective actions as described above.

The processing hardware of AR device 102c may further execute the other instantiation of software code 110 resident in the memory of AR device 102c to perform the additional actions of receiving, contemporaneously with rendering AR effect(s) on the display of AR device 102c, signal 124 (action 694), and pausing or looping, in response to receiving signal 124, the playing of media content 152 on display screen 154b (action 695). In some implementations, signal 124 may be received by AR device 102c from AR device 102a, via communication network 108 and network communication links 118. However, in other implementations, signal 124 may be transmitted to media content source 151 in action 364, and may be received by AR device 102c in action 694 from media content source 151, via communication network 108 and network communication links 118.

It is noted that, in some implementations, resumption signal 156 may be generated and transmitted to media content source 151 or AR device 102c at the discretion of user 101a, who may be the leader of the group watch session. In those implementations, resumption signal 156 may be generated and transmitted in response to an action by user 101a of AR device 102a. Actions by user 101a to which generation and transmission of resumption signal 156 may be responsive may include an input to AR device 102a using input device 232 of AR device 102a, a voice command, a gaze change, for example gazing away from AR effect(s) 180, a movement, or deactivation of AR device 102a, for example. For instance. AR device 102a being put down or turned off may trigger generation and transmission of resumption signal 156.

Alternatively, in some implementations, resumption signal 156 may be generated and transmitted to media content source 151 or an AR device 102a or 102c at the discretion of either of user 101a or 101c during a group watch session. In those implementations, resumption signal 156 may be generated and transmitted in response to an action by one of users 101a or 101c of respective AR devices 102a and 102c. Actions by user 101a or 101c to which generation and transmission of resumption signal 156 may be responsive may include an input to AR device 102a or 102c using input device 232, a voice command, a gaze change, for example gazing away from AR effect(s) 180, a movement, or deactivation of AR device 102a or 102c, for example. For instance, AR device 102a or 102c being put down or turned off may trigger generation and transmission of resumption signal 156.

With respect to the actions outlined by flowcharts 360 and 690, it is emphasized that, in some implementations, actions 361 through 364, or action 361 through 365, or actions 361 through 365 and actions 691 through 695, may be performed as an automated method.

Thus, as described above, the present application discloses systems and methods for providing user responsive AR enhancement of moving images. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
an augmented reality (AR) device having a first display, a processing hardware, and a memory storing a software code;
the processing hardware configured to execute the software code to:
monitor playing of media content including a sequence of moving images being displayed on a second display separate from the AR device and controlled by a media player device;
detect, based on monitoring the media content being played on the second display, an image in the sequence of moving images for enhancement by one or more AR effects;
render the one or more AR effects on the first display; and
transmit, contemporaneously with rendering the one or more AR effects on the first display, a signal configured to pause or loop the playing of the media content on the second display.

2. The system of claim 1, wherein the media player device and the AR device share a bidirectional communication channel, and wherein the processing hardware is further configured to execute the software code to:
sense an interaction by a user with the one or more AR effects; and
transmit the sensed interaction to the media player device via the bidirectional communication channel;
wherein the media player device is configured to identify, using the sensed interaction, one or more other images in the sequence of moving images for displaying on the second display; and
display the one or more other images on the second display.

3. The system of claim 1, wherein the processing hardware is further configured to execute the software code to:
transmit, in response to an action by a user, a resumption signal configured to resume the playing of the media content on the second display at a timestamp or video frame number where the playing of the media content on the second display was paused or looped.

4. The system of claim 3, wherein the action comprises a voice command, a movement, a gaze change, or a deactivation of the AR device.

5. The system of claim 1, wherein the processing hardware is further configured to execute the software code to:
transmit, in response to an action by a user, a resumption signal configured to resume the playing of the media content on the second display at a timestamp or video frame number other than a timestamp or video frame number where the playing of the media content on the second display was paused or looped.

6. The system of claim 5, wherein the action comprises a voice command, a movement, a gaze change, or a deactivation of the AR device.

7. The system of claim 1, wherein the signal configured to pause or loop the playing of the media content on the second display is one of transmitted to the media player device or transmitted to a remote source of the media content.

8. The system of claim 1, wherein the AR device is a first AR device used by a first user, the system further comprising:
a second AR device used by a second user, the second AR device having a second AR display, a second processing hardware, and a second memory storing a second software code;
the second processing hardware configured to execute the second software code to:
monitor, contemporaneously with monitoring the playing of the media content on the second display by the first AR device used by the first user, playing of the media content including the sequence of moving images being displayed on a display screen separate from the second AR device;
detect, based on monitoring the media content being played on the display screen, the image for enhancement by the one or more AR effects;
render the one or more AR effects on the second AR display;
receive, contemporaneously with rendering the one or more AR effects on the second AR display, the signal configured to pause or loop the playing of the media content; and
pause or loop, in response to receiving the signal, the playing of the media content on the display screen.

9. The system of claim 1, wherein the processing hardware is further configured to execute the software code to:
receive a display parameter of the second display playing the media content, and
render the one or more AR effects on the first display of the AR device, using the display parameter of the second display playing the media content.

10. The system of claim 9, wherein the display parameter comprises a hue, a saturation, a brightness, a contrast, or a tint setting of the second display.

11. A method for use by a system including an augmented reality (AR) device having a first display, processing hardware, and a memory storing a software code, the method comprising:
monitoring, by the software code executed by the processing hardware, playing of media content including a sequence of moving images being displayed on a second display separate from the AR device and controlled by a media player device;
detecting, by the software code executed by the processing hardware based on monitoring the media content being played on the second display, an image in the sequence of moving images for enhancement by one or more AR effects;
rendering, by the software code executed by the processing hardware, the one or more AR effects on the first display; and
transmitting, by the software code executed by the processing hardware contemporaneously with rendering the one or more first AR effects on the first display, a signal configured to pause or loop the playing of the media content on the second display.

12. The method of claim 11, wherein the media player device and the AR device share a bidirectional communication channel, the method further comprising:

sensing, by the software code executed by the processing hardware, an interaction by a user with the one or more AR effects; and transmitting, by the software code executed by the processing hardware, the sensed interaction to the media player device via the bidirectional communication channel;

wherein the media player device is configured to identify, using the sensed interaction, one or more other images in the sequence of moving images for displaying on the second display; and display the one or more other images on the second display.

13. The method of claim 11, further comprising:
transmitting, by the software code executed by the processing hardware in response to an action by a user, a resumption signal configured to resume the playing of the media content on the second display at a timestamp or video frame number where the playing of the media content on the second display was paused or looped.

14. The method of claim 13, wherein the action comprises a voice command, a movement, a gaze change, or a deactivation of the AR device.

15. The method of claim 11, further comprising:
transmitting, by the software code executed by the processing hardware in response to an action by a user, a resumption signal configured to resume the playing of the media content on the second display at a timestamp or video frame number other than a timestamp or video frame number where the playing of the media content on the second display was paused or looped.

16. The method of claim 15, wherein the action comprises a voice command, a movement, a gaze change, or a deactivation of the AR device.

17. The method of claim 11, wherein the signal configured to pause or loop the playing of the media content on the second display is one of transmitted to the media player device or transmitted to a remote source of the media content.

18. The method of claim 11, wherein the AR device is a first AR device used by a first user, and wherein the system further comprises a second AR device used by a second user, the second AR device having a second AR display, a second processing hardware, and a second memory storing a second software code, the method further comprising:
monitoring, by the second software code executed by the second processing hardware, contemporaneously with monitoring the playing of the media content on the second display by the first AR device used by the first user, playing of the media content including the sequence of moving images being displayed on a display screen separate from the second AR device;

detecting, by the second software code executed by the second processing hardware based on monitoring the media content being played on the display screen, the image for enhancement by the one or more AR effects;

rendering, by the second software code executed by the second processing hardware, the one or more AR effects on the second AR display;

receiving, by the second software code executed by the second processing hardware contemporaneously with rendering the one or more first AR effects on the second AR display, the signal configured to pause or loop the playing of the media content; and pausing or looping, by the second software code executed by the second processing hardware in response to receiving the signal, the playing of the media content on the display screen.

19. The method of claim 11, further comprising:
receiving, by the software code executed by the processing hardware, a display parameter of the second display playing the media content, and rendering the one or more first AR effects on the first display of the AR device using the display parameter of the second display playing the media content.

20. The method of claim 19, wherein the display parameter comprises a hue, a saturation, a brightness, a contrast, or a tint setting of the second display.

21. An augmented reality (AR) device for use with a media player device, the AR device comprising:
a first display;
a processing hardware; and
a memory storing a software code;
the processing hardware configured to execute the software code to:
monitor playing of media content including a sequence of moving images being displayed on a second display separate from the AR device and controlled by the media player device;

detect, based on monitoring the media content being played on the second display, an image in the sequence of moving images for enhancement by one or more AR effects;

render the one or more AR effects on the first display; and transmit, contemporaneously with rendering the one or more AR effects on the first display, a signal configured to pause or loop the playing of the media content on the second display.

22. The AR device of claim 21, wherein the processing hardware is further configured to execute the software code to:
sense an interaction by a user with the one or more AR effects; and
transmit the sensed interaction to the media player device.

23. The AR device of claim 21, wherein the processing hardware is further configured to execute the software code to:
transmit, in response to an action by a user, a resumption signal configured to resume the playing of the media content on the second display after the playing of the media content on the second display was paused or looped.

24. The AR device of claim 23, wherein the action comprises a voice command, a movement, a gaze change, or a deactivation of the AR device.

25. The AR device of claim 21, wherein the processing hardware is further configured to execute the software code to:
receive a display parameter of the second display playing the media content, and
render the one or more AR effects on the first display of the AR device, using the display parameter of the second display playing the media content.

26. The AR device of claim 25, wherein the display parameter comprises a hue, a saturation, a brightness, a contrast, or a tint setting of the second display.

* * * * *